Feb. 20, 1923.
J. H. GRAY.
SLAG POCKET AND METHOD OF REMOVING SLAG.
FILED MAY 13, 1922.
1,445,679.
2 SHEETS—SHEET 1.
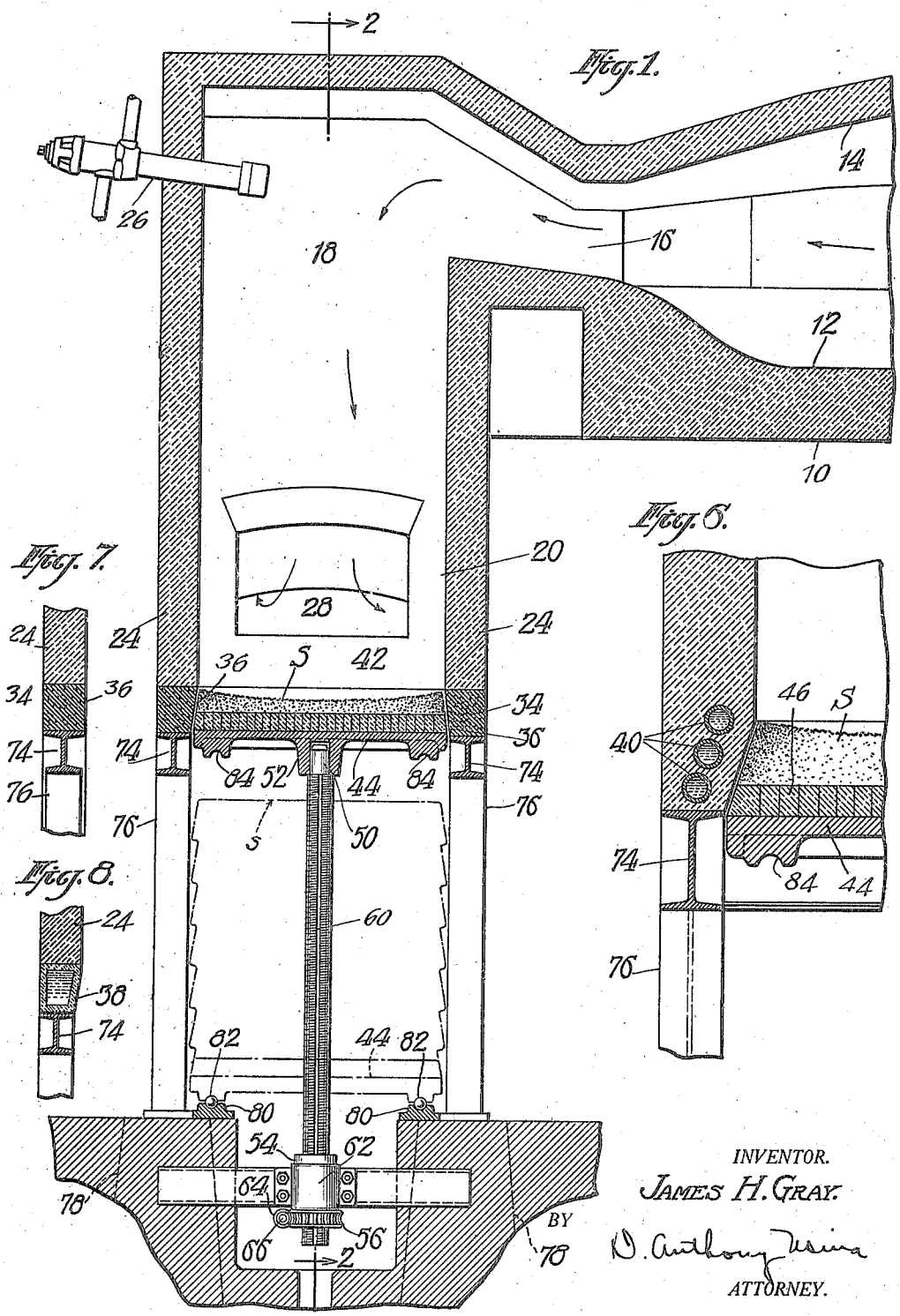
INVENTOR.
JAMES H. GRAY.
BY
ATTORNEY.

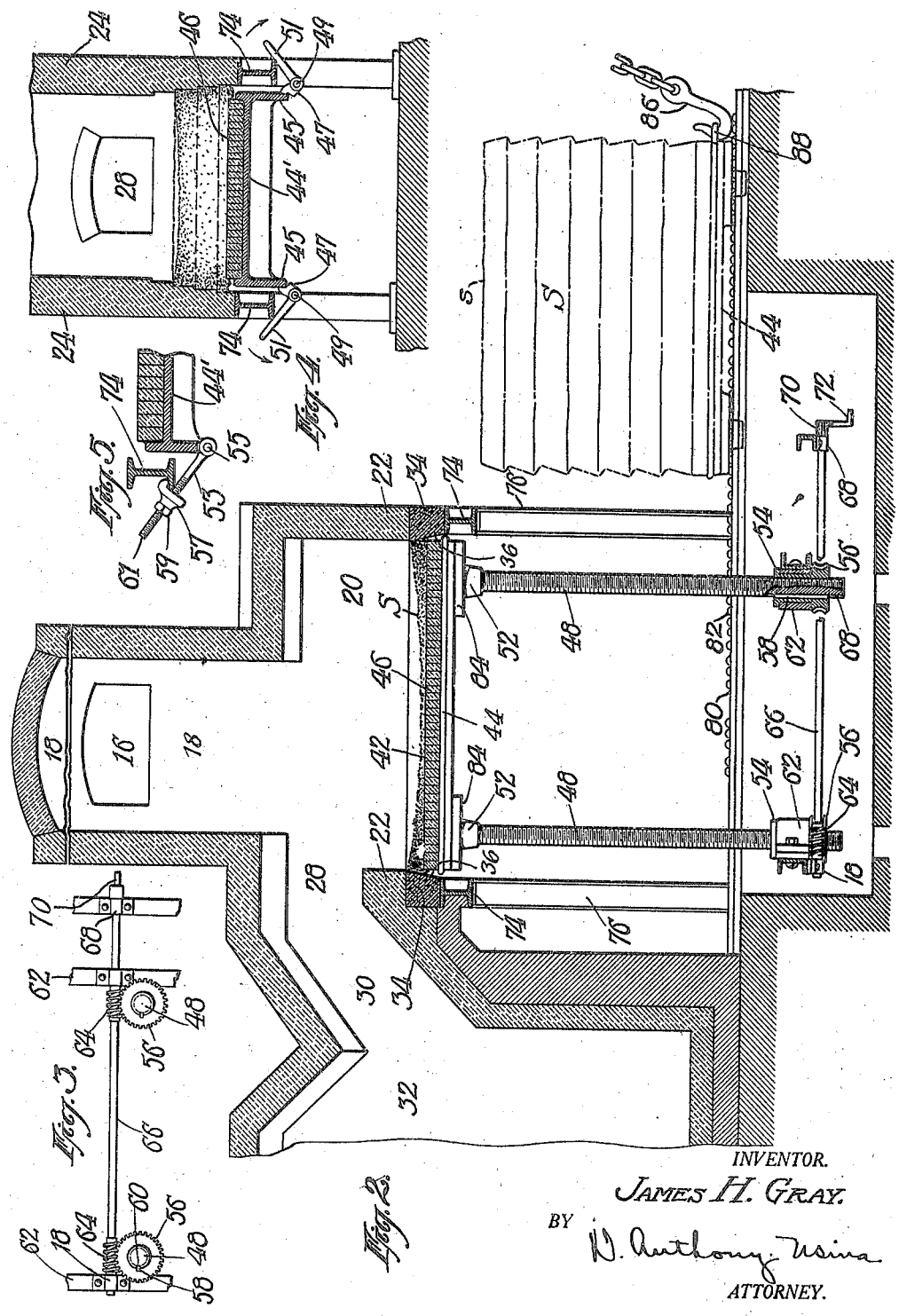

Patented Feb. 20, 1923.

1,445,679

UNITED STATES PATENT OFFICE.

JAMES H. GRAY, OF NEW YORK, N. Y.

SLAG POCKET AND METHOD OF REMOVING SLAG.

Application filed May 13, 1922. Serial No. 560,625.

*To all whom it may concern:*

Be it known that I, JAMES H. GRAY, a citizen of the United States, and resident of the city, county, and State of New York, have invented certain new and useful Improvements in Slag Pockets and Methods of Removing Slag, of which the following is a specification.

This invention relates to metallurgical furnaces and to a method of removing the slag therefrom.

Typical open hearth furnaces comprise a hearth and flues at each end of the furnace which are connected to regenerators through which the gas and air is alternately introduced and discharged so that the regenerators on the incoming end preheat the gas and air and the products of combustion at the outgoing end heat the regenerators. Below the flues are usually located deep chambers known as slag pockets which are adapted to catch the suspended particles of pulverized ore, limestone, fluorspar and so forth carried by the gases at the outgoing end of the furnace. It is desirable to prevent this dust or slag from entering the regenerative chambers and, therefore, the slage pockets are usually formed so that their bottoms are located a great distance below the port leading to such regenerative chambers.

The slag gradually accumulates in these deep pockets until it weighs many tons. At the end of a furnace campaign, say approximately three months, it has heretofore been the practice to open up the slag pockets and wait for several days to permit them to cool sufficiently so that workmen could enter and break up the accumulated slag prior to its manual removal. This is a laborious and expensive operation and necessitates shutting down the furnace for an objectionable length of time.

Furthermore, when the furance is initially started or put into commission, the slag pockets at the ends of the furnace are empty and constitute large chambers from which the heat radiates, thus cooling the gas or air passing therethrough and interfering with the draft of the furnace and causing a slowing up of the production. This slowing up or lag may cause as much as a 10% loss in production.

My invention contemplates the use of a slage pocket having a movable bottom which can be periodically lowered as the slag accumulates. This permits me to use slag pockets of minimum depth so that the draft of the furnace is not materially interfered with. Means are provided whereby the accumulating slag is constantly being cooled by exposure to the surrounding atmosphere, so that at the time the slag is to be removed it is not necessary to lose any time to allow for such cooling.

My invention also contemplates the use of a slag pocket having a lower marginal section constructed of material which will quickly radiate the heat and to which the slag will not readily adhere.

Those skilled in the art are aware that open hearth furnaces are often built up of separate up-takes for supplying fuel and air and each up-take is usually built with a slag pocket. Other furnaces adapted to burn liquid fuel are provided with single up-takes at each end of the furnace through which the air is introduced. These up-takes act as flues for carrying off products of combustion at the outgoing end of the furnace. With liquid fuel burning furnaces it is only necessary to provide a single slag pocket at each end of the furnace as will be understood.

In the interest of simplicity of illustration, I have shown an open hearth furnace adapted to use liquid fuel and having one slag pocket at each end of the furnace, although it is to be understood that the invention can be practiced in furnaces having both gas and air up-takes at each end of the furnace.

In the accompanying drawings, Fig. 1 is a longitudinal section through one end of an open hearth furnace embodying my invention.

Fig. 2 is a transverse section on line 2—2 of Fig. 1;

Fig. 3 is a detail plan showing means for moving the bottom of the slag pocket;

Fig. 4 is a fragmentary view showing a modification;

Fig. 5 is a fragmentary view showing an alternative arrangement for holding the bottom shown in Fig. 4;

Figs. 6, 7 and 8 are fragmentary views illustrating modified details of construction.

Referring first to Figs. 1 and 2, 10 represents a furnace having a hearth 12 and a roof 14 which is connected by a port 16 with a flue 18 which on the incoming end of the furnace tends to convey the air into the furnace chamber and on the outgoing end of the furnace serves to convey the products of combustion to a slag pocket 20 which is formed with side walls 22 and end walls 24. The end walls 22 are in fact a continuation of the end walls of the flue 18. A suitable liquid fuel burner is mounted at 26 and adapted to supply vaporized fuel which will mix with the air introduced through the flue 18. A port 28 is formed in one of the walls 22 and communicates with a downwardly inclined port 30 which opens into one of the regenerative chambers 32.

The lower end of the slag pocket is provided with a marginal section 34, preferably, though not necessarily, made of carbonaceous material such as amorphous carbon formed by packing carbon and compressing it with tar or pitch as a binder. This section is usually formed by blocks which may be as large as 28 inches square in section and from 12 to 14 feet long, and the material of which they are made is similar to that used for the electrodes used in electric arc furnaces. This carbonaceous material is an excellent conductor of heat and, therefore, rapidly radiates the heat of the accumulated slag to the surrounding atmosphere. It is also much more slippery than the material of which the walls 22 and 24 of the slag pocket are built, and its nature is such that the accumulated slag does not tend to adhere thereto as readily as it does to the usual brick walls of the slag pocket. The inner surface 36 of the marginal section 34 may be bevelled as shown in Fig. 1 or it may be a square surface, as shown in Fig. 7.

Instead of forming this lower marginal section of carbonaceous material, I may provide a water cooled section 38 of box-like formation as shown in Fig. 8, or I may embed cooling pipes 40 in the lower end of the walls of the slag pocket as shown in Fig. 6. The advantage common to the section 34, the jacket 38 and the cooling pipes 40, is that the slag accumulated in the lower part of the slag pocket will be cooled as soon as it is deposited on the bottom of said slag pocket so that it will not readily unite with the adjacent walls. When the lower marginal section is made of carbonaceous material, no water cooling arrangement is necessary because such material radiates the heat more quickly than ordinary brickwork and this material has the added advantage as above stated of being more slippery than ordinary refractory brick. Instead of using carbonaceous material I also contemplate the use of graphite blocks which is more slippery than carbon although comparatively more expensive.

The slag pocket 20 is not nearly so deep as slag pockets heretofore constructed. As will be seen in Fig. 2, the upper surface 42 of the bottom 44 is only a short distance below the port 28 leading to the regenerative chambers.

Means are provided for lowering the bottom 44 periodically as the slag accumulates thereon. As seen in Fig. 2 the bottom 44 is provided with a brick facing 46 and said bottom is supported on a pair of vertical screws 48 which are shouldered down at 50 and seated in bosses 52 formed on the underside of the bottom 44. The portions 50 loosely engage the bosses 52 so that when the bottom is moved to its lower position as hereinafter described, the screws can readily be lowered so as to disconnect the bottom therefrom. The screws 48 pass through threaded sleeves 54 formed on worm gears 56. These sleeves carry a feather 58 so that as the worms 56 are rotated the screws 48 will be moved longitudinally, said screws being provided with suitable keyways 60. Bearings 62 are carried on a fixed support and rotatably support the worm gears 56. Worms 64 are carried on a shaft 66 which is mounted in suitable bearings 68 and provided with a squared end 70 to which an operating crank or wrench 72 may be applied. As thus arranged it will be readily seen that by turning the crank 72 the bottom 44 can be raised or lowered at will.

The slag pocket side walls are carried by suitable girders 74 which in turn are supported on columns 76 carried on piers 78. The columns 76 are so located that when the bottom 44 is moved to its lowest position as shown in dotted lines in Fig. 1, said bottom can be moved laterally without interference with said columns.

Located between the columns 76 are laterally extending tracks 80 which are grooved to support a plurality of balls 82. The underside of the bottom 44 is provided with curved portions 84 adapted to engage balls 82 when the bottom 44 is moved to its lowest position.

When the furnace is initially started the bottom 44 will be positioned as shown in Fig. 1 and the slag S will accumulate thereon as shown. The layer of slag shown is assumed to be only a few inches deep and does not extend above the top of the lower section 34. Therefore, the heat of this slag will readily be dissipated into the surrounding atmosphere. After a first layer has accumulated the workmen will give the hand crank 72 a few turns so as to lower the bottom 44 and permit another layer of slag to accumulate and cool on the first formed layer, and this operation will be periodically repeated every two or three days during the entire run or campaign of the furnace which extends approximately over three months' time. It will be appreciated that after the first few lowering movements of the bottom 44 the separate cakes or layers of slag will be wholly exposed to the surrounding atmosphere and will be gradually cooling during the operation of the furnace so that when the bottom 44 reaches the lowermost or dotted position shown in Fig. 1, the accumulated slag will be sufficiently cooled to permit its ready removal. At the time of removal, the bottom 44 will be lowered to such position that the upper surface s of the accumulated mass of slag is lower than the supporting girders 74, and the bottom 44 will rest on the balls 82. Then by means of a crane or other traction device the bottom 44 will be moved laterally as indicated in Fig. 2, this figure showing a crane-hook 86 engaging a suitable eye 88 in the end of the bottom 44, it being understood that before the bottom is moved laterally the screws 48 have been turned sufficiently to disengage the shouldered ends 50 from the bosses 52 formed on the underside of the removable bottom.

Instead of periodically lowering the bottom 44 by means of the adjustable screws 52 as shown, I may use other equivalents such as a hydraulic jack or a ratchet or rack and pinion devices without departing from the invention, it being understood emphatically that the idea of periodically lowering the bottom of a slag pocket is broadly new.

Instead of supporting the bottom on adjustable jacks of any type I may use the more primitive and crude arrangement as shown in Fig. 4, in which the bottom 44' is provided with ribs 45 which rest on dogs 47 carried on pivots 49 supported in suitable brackets secured to the underside of the girders 74. The dogs 49 are provided with fingers 51 which are adapted to be struck with a hammer or sledge to rock the dogs and permit the same to free the bottom 44' so that it can drop to the ground by gravity. With this arrangement the slag will accumulate in the lower end of the slag pocket for slightly longer periods of time, although, of course, if desired the bottom could be dropped at time intervals corresponding to the times at which the screws 42 were lowered in the first described arrangement.

As an alternative for the dogs 47 shown in Fig. 4, I may provide eye-bolts 53 pivoted at 55 to the underside of the bottom 44', said eye-bolts being provided with a claw 57 which hooks over the flanges of the girders 74, said claw being held in place by nut 59 secured to the threaded end 61 of said eyebolt. When it is desired to release the bottom 44' the nuts 59 will be loosened so as to permit the bottom to drop to the ground as will be understood.

From the above it will be seen that my invention provides a novel method and means for removing the accumulated slag from an open hearth furnace and that the arrangement is such that the slag is periodically lowered and exposed to the cooling action of the surrounding atmosphere. The lower end of the slag pocket is provided with a section adapted to cool the slag as it accumulates so that it will not adhere to the walls of the slag pocket. Furthermore means are provided whereby the accumulated slag will slip relatively to the walls of the slag pocket as the bottom is lowered. It will be clear to those skilled in the art that the arrangement herein described provides means whereby the slag can be removed much more rapidly than by the practice now in vogue, and that it is unnecessary to have the furnace remain idle for the purpose of cooling the slag after the furnace is shut down. It will further be appreciated that after the removable bottom has been lowered and the mass of slag moved laterally that the down-takes are open for the free access of air which will cause the end ports of the furnace to rapidly cool so that the repair work to those parts which is usually done at the end of each campaign can be started almost immediately after the removal of the slag.

Though I have described with great particularity the constructive details and the particular method employed, it is not to be construed that I am limited thereto as changes may be made by those skilled in the art without departing from the invention as defined in the appended claims.

What I claim is:

1. A metallurgical furnace having a slag pocket formed with a movable bottom adapted to be moved to successive positions to permit the gradual accumulation of slag thereon to facilitate the ultimate removal of slag as a mass.

2. A metallurgical furnace having a shallow slag pocket and means for keeping the top level of the constantly accumulating slag at substantially or approximately the same horizontal plane during the continuous operation of the furnace.

3. A metallurgical furnace having a slag pocket formed with a movable bottom and means for preventing the slag from adhering to the lower portion of the side walls of said slag pocket so that as the movable bottom is lowered the solidified mass of slag will readily move with it.

4. A metallurgical furnace having a slag pocket formed with a movable bottom, means for periodically lowering said bottom as the slag accumulates and means for supporting said bottom for lateral horizontal movement when in its lowered position.

5. A metallurgical furnace having a slag pocket formed with a movable bottom and a marginal lining adjacent the lower portion of the walls of said slag pocket adapted to readily dissipate the heat from the accumulated slag.

6. A metallurgical furnace including means for periodically lowering the accumulated slag to expose it to the cooling effect of the surrounding atmosphere.

7. A metallurgical furnace having a slag pocket whose walls include a lower marginal section composed of material that is comparatively slippery, and a movable bottom arranged to be lowered as the slag accumulates.

8. A metallurgical furnace having a slag pocket whose walls include a lower comparatively slippery marginal section of carbonaceous material to which the slag will not adhere as the slag is lowered and a movable bottom for said slag pocket adapted to be periodically lowered as the slag accumulates.

9. A metallurgical furnace having a slag pocket provided with a movable bottom, a water cooled marginal section adjacent the lower end of the walls of the slag pocket adapted to prevent the slag from adhering to said walls.

10. In combination with the slag pocket of a metallurgical furnace, a movable bottom, means detachably engaging said movable bottom for periodically lowering the bottom as the slag accumulates and tracks below said slag pocket adapted to support said bottom for lateral movement in its lowered position.

11. The method of removing slag from the slag pocket of a furnace which consists in periodically lowering the bottom of the slag pocket during the operation of the furnace as the slag accumulates thereon.

12. The method of removing slag from the slag pocket of a furnace which consists in periodically lowering the bottom of the slag pocket during the operation of the furnace as the slag accumulates thereon and moving the accumulated mass laterally when the furnace is shut down.

13. The method of removing slag from the slag pocket of an open hearth furnace which consists in lowering the slag while the furnace is in operation to expose it to the cooling effect of the surrounding atmosphere.

In witness whereof, I have hereunto signed my name.

JAMES H. GRAY.